R. C. JENKINSON.
Assignor to R. W. CHAPMAN.
SHEET METAL HANDLE FOR TRAVELING BAGS.
No. 10,845. Reissued June 14, 1887.
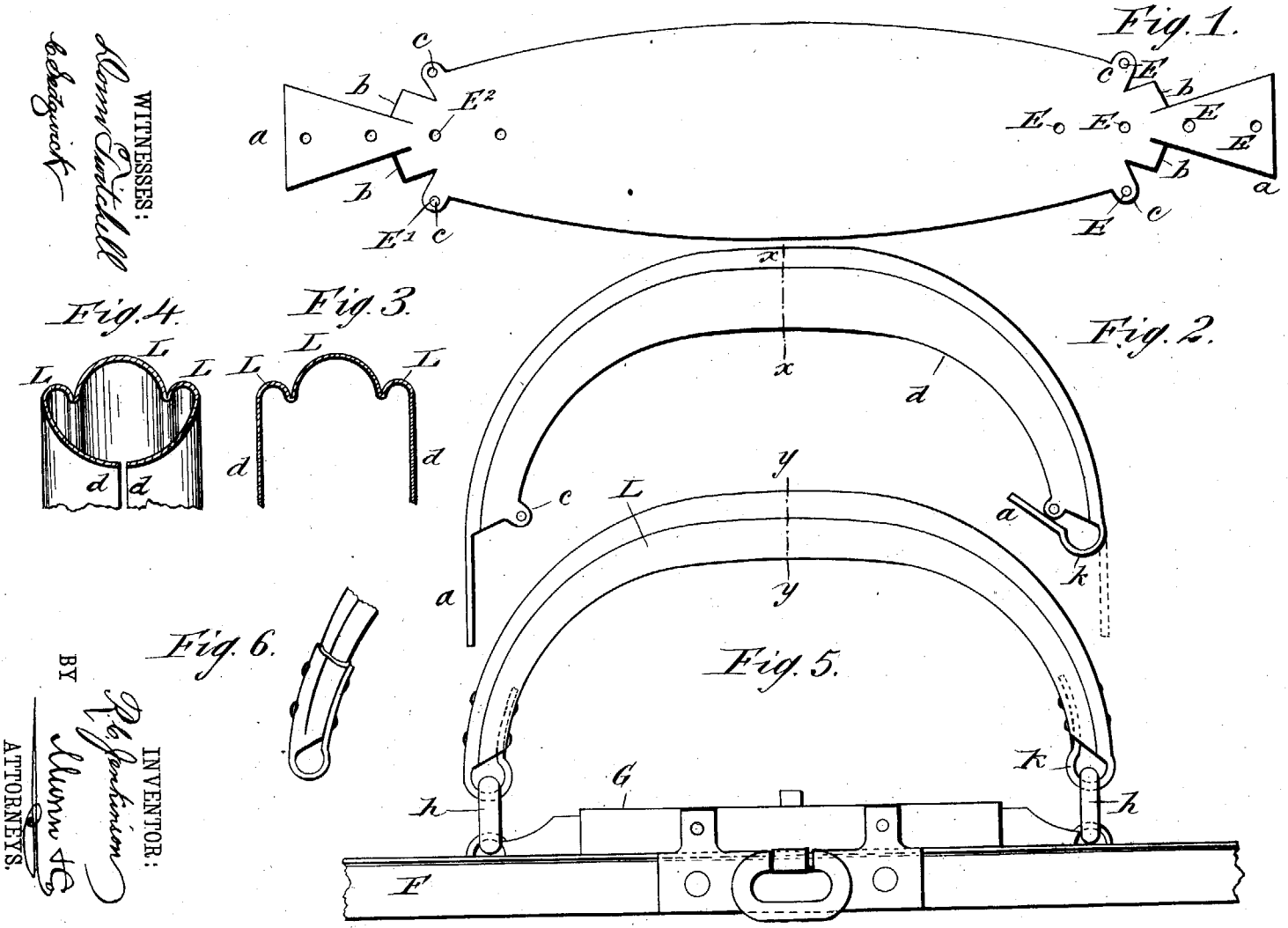
WITNESSES:
Donn Twitchell
C. Sedgwick
INVENTOR:
R. C. Jenkinson
BY Munn & Co.
ATTORNEYS.
N. PETERS. Photo-Lithographer, Washington, D. C.

UNITED STATES PATENT OFFICE.

RICHARD C. JENKINSON, OF NEWARK, NEW JERSEY, ASSIGNOR TO ROBERT W. CHAPMAN, OF SAME PLACE.

SHEET-METAL HANDLE FOR TRAVELING-BAGS.

SPECIFICATION forming part of Reissued Letters Patent No. 10,845, dated June 14, 1887.

Original No. 342,360, dated May 25, 1886. Application for reissue filed March 25, 1887. Serial No. 232,425.

*To all whom it may concern:*

Be it known that I, RICHARD C. JENKINSON, a citizen of the United States, residing at Newark, Essex county, and State of New Jersey, have invented certain new and useful Improvements in Sheet-Metal Handles for Traveling-Bags and other Articles; and I hereby declare that the following is a full, clear, and exact description of the same.

My invention consists in a novel construction of a sheet-metal handle, as hereinafter described.

The invention consists in forming from a single piece of sheet metal a handle which shall be cheap and durable, and of such shape as will be comfortable and give a good hold to the hand, and also closely imitate a solid leather handle, such as is used on the best grades of goods.

The blank from which the handle is formed is cut from a sheet of metal, and then stamped, bent, and corrugated by suitable dies for the purpose.

In constructing the handle I first cut a tapering blank, as shown in Figure 1, having at each end dovetailed straps *a a*, on each side of which are ears *b b*, which are bent inward at right angles to the body of the handle, and thus form a neat finish to the end of the handle. At the end of the main body of the blank are eyes *c c*, which, when the walls *d d* are brought together, overlap each other, and a rivet passing through the holes E E after the handle has been bent into shape, as shown in Fig. 5, will very firmly fasten the dovetailed pieces so that they cannot be drawn out of place. Fig. 2 shows the blank, as described, having the general outline shape of the completed handle. Fig. 3 is a view through line *x x* in Fig. 2, and shows the downwardly-projecting walls *d d*, which are afterward closed together edge to edge, with the seam directly in the center on the under side of the handle, as plainly shown in Fig. 4. The corrugations L L, of clover-leaf or triple-arch shape, not only serve to adorn the handle, but tend very materially to stiffen and strengthen it, and by their use I can use a much lighter metal than if the handle were made of an oval or tubular shape. Fig. 4 is a view in cross-section through line *y y* in Fig. 5, and shows the triple-arch or clover-leaf shape of the handle. Fig. 5 shows the completed handle attached to the lock G and frame F by the ordinary and well-known ring connections *h h*. Fig. 6 is a section of a metal handle constructed as herein shown, but without the end pieces, *a a*, and in their place is a metal cap fitting over the ends of the handle and connected with the lock and frame of a bag by a ring or other suitable device.

Instead of providing the handle with the end pieces shown in Figs. 5 and 6, I may employ any suitable means for connecting the handle with the traveling-bag or other articles to which my improved handle is to be applied.

It will be noticed that the dovetailed end pieces, being bent inwardly, as at *k*, will lie snugly between the walls *d d*, which taper at the ends, and they may be secured by a rivet passing through the holes E E. In practice, I find that a rivet passing through the holes E′ in the eyes *c c* and the holes E² at the ends of the body of the handle are amply sufficient for all practical purposes.

I am aware that patents have been granted for metal handles formed from one piece of metal; but they do not bear any resemblance to a solid leather stitched handle, much esteemed by purchasers of bags, as they all have been of a tubular or circular form in cross-section, while my handle is a close imitation of a real leather handle.

I am also aware of the Patent No. 317,300, granted to R. W. Chapman, May 5, 1885, for a metal handle in two sections, which also imitates a solid leather handle.

Having thus fully described my invention, what I claim as new, and desire to secure by Letters Patent of the United States, is—

1. As an improved article of manufacture, the herein-described traveling-bag handle, made of a single piece of metal and provided with triple corrugations, substantially as shown and described.

2. As an improved article of manufacture, the herein-described traveling-bag handle, made of a single piece of metal and provided with the triple corrugations and the dovetail ends, substantially as shown and described.

RICHARD C. JENKINSON.

Witnesses:

HENRY B. TAYLOR,
AMZI D. TAYLOR.